United States Patent
Nagarajan et al.

(10) Patent No.: US 12,284,117 B2
(45) Date of Patent: Apr. 22, 2025

(54) LOAD BALANCING OF ASSISTED REPLICATION NETWORK DEVICES

(71) Applicant: Juniper Networks, Inc., Sunnyvale, CA (US)

(72) Inventors: Vikram Nagarajan, Bangalore (IN); Wen Lin, Andover, MA (US); Soumyodeep Joarder, Bangalore (IN); Muniyappan Suruttaiyan, Krishnagiri (IN); Princy T. Elizabeth, Bangalore (IN); Ragupathi J, Trichy (IN); SelvaKumar Sivaraj, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 396 days.

(21) Appl. No.: 17/946,310

(22) Filed: Sep. 16, 2022

(65) Prior Publication Data
US 2024/0098026 A1    Mar. 21, 2024

(51) Int. Cl.
*H04L 47/125*    (2022.01)
*H04L 12/46*    (2006.01)
*H04L 47/25*    (2022.01)

(52) U.S. Cl.
CPC ........ *H04L 47/125* (2013.01); *H04L 12/4641* (2013.01); *H04L 47/25* (2013.01)

(58) Field of Classification Search
CPC .... H04L 12/4641; H04L 47/125; H04L 47/25
See application file for complete search history.

(56) References Cited

U.S. PATENT DOCUMENTS 9,407,555 B2 * 8/2016 Wu .................. H04L 12/18
10,027,589 B1 * 7/2018 Singh ............... H04L 61/103
(Continued)

FOREIGN PATENT DOCUMENTS

| EP | 3276896 A1 | 1/2018 |
| EP | 3799371 A1 | 3/2021 |
| WO | 2020226953 A1 | 11/2020 |

OTHER PUBLICATIONS

Extended European Search Report for Application No. EP22205801, mailed on Aug. 18, 2023, 11 Pages.
(Continued)

*Primary Examiner* — George C Neurauter, Jr.
(74) *Attorney, Agent, or Firm* — Harrity & Harrity, LLP

(57) ABSTRACT

A controller device receives, from a plurality of assisted replication network devices, respective utilization information associated with the plurality of assisted replication network devices. The controller device generates, based on the respective utilization information associated with the plurality of assisted replication network devices, load balancing information for a network device associated with two or more assisted replication network devices of the plurality of assisted replication network devices, and sends, to the network device, the load balancing information. The network selects, based on the load balancing information, a particular assisted replication network device of the two or more assisted replication network devices. The network device receives a traffic flow that is to be multicast and sends the traffic flow to the particular assisted replication network device, wherein sending the traffic flow to the particular assisted replication network device permits the particular assisted replication network device to multicast the traffic flow.

20 Claims, 9 Drawing Sheets

(56) References Cited

U.S. PATENT DOCUMENTS

| | | | |
|---|---|---|---|
| 10,855,588 B2 * | 12/2020 | Sarva | H04L 45/64 |
| 11,233,741 B1 * | 1/2022 | N | H04L 45/24 |
| 11,329,918 B2 * | 5/2022 | Sarva | H04L 47/125 |
| 11,418,403 B2 * | 8/2022 | Mohanty | H04L 41/14 |
| 11,665,088 B2 * | 5/2023 | Suryanarayana | H04L 45/64 |
| | | | 370/254 |
| 11,895,028 B2 * | 2/2024 | Subagio | H04L 45/7453 |

OTHER PUBLICATIONS

Vikram, N., et al., "Day One: Deploying Optimized Multicast in EVPN/VXLAN" in: "Day One: Deploying Optimized Multicast in EVPN/VXLAN," Juniper Network Books, Feb. 2020, pp. 1-186. Retrieved from the Internet: [URL: https://www.juniper.net/documentation/en_US/day-one-books/DO_Optimized_Multicast_EVPN.pdf].

* cited by examiner

LOAD BALANCING OF ASSISTED REPLICATION NETWORK DEVICES

BACKGROUND

An Ethernet virtual private network (EVPN) may allow a group of dispersed client sites (e.g., included in a virtual local area network (VLAN)) to be connected using a data link layer (e.g., layer 2) virtual bridge.

SUMMARY

In some implementations, a device includes one or more memories; and one or more processors. The one or more processors are to: receive, from a first assisted replication network device, first utilization information associated with the first assisted replication network device; receive, from a second assisted replication network device, second utilization information associated with the second assisted replication network device; determine, based on the first utilization information, a first utilization value associated with the first assisted replication network device; determine, based on the second utilization information, a second utilization value associated with the second assisted replication network device; identify a network device associated with the first assisted replication network device and the second assisted replication network device; generate, based on identifying the network device, the first utilization value, and the second utilization value, load balancing information for the network device; and send, to the network device, the load balancing information, wherein sending the load balancing information to the network device is to permit the network device to select a particular assisted replication network device, of the first assisted replication network device and the second assisted replication network device, to which the network device is to send a traffic flow that is to be multicast by the particular assisted replication network device.

In some implementations, a method includes receiving, by a device and from a plurality of assisted replication network devices, respective utilization information associated with the plurality of assisted replication network devices; generating, by the device and based on the respective utilization information associated with the plurality of assisted replication network devices, load balancing information for a network device associated with two or more assisted replication network devices of the plurality of assisted replication network devices; and sending, by the device and to the network device, the load balancing information.

In some implementations, a non-transitory computer-readable medium storing a set of instructions includes one or more instructions that, when executed by one or more processors of a network device, cause the network device to: receive, from an origination device, a traffic flow that is to be multicast; receive, from another device, load balancing information; select, based on the load balancing information, a particular assisted replication network device of two or more assisted replication network devices associated with the network device; and send the traffic flow to the particular assisted replication network device, wherein sending the traffic flow to the particular assisted replication network device permits the particular assisted replication network device to multicast the traffic flow.

DETAILED DESCRIPTION

Figure 1A:
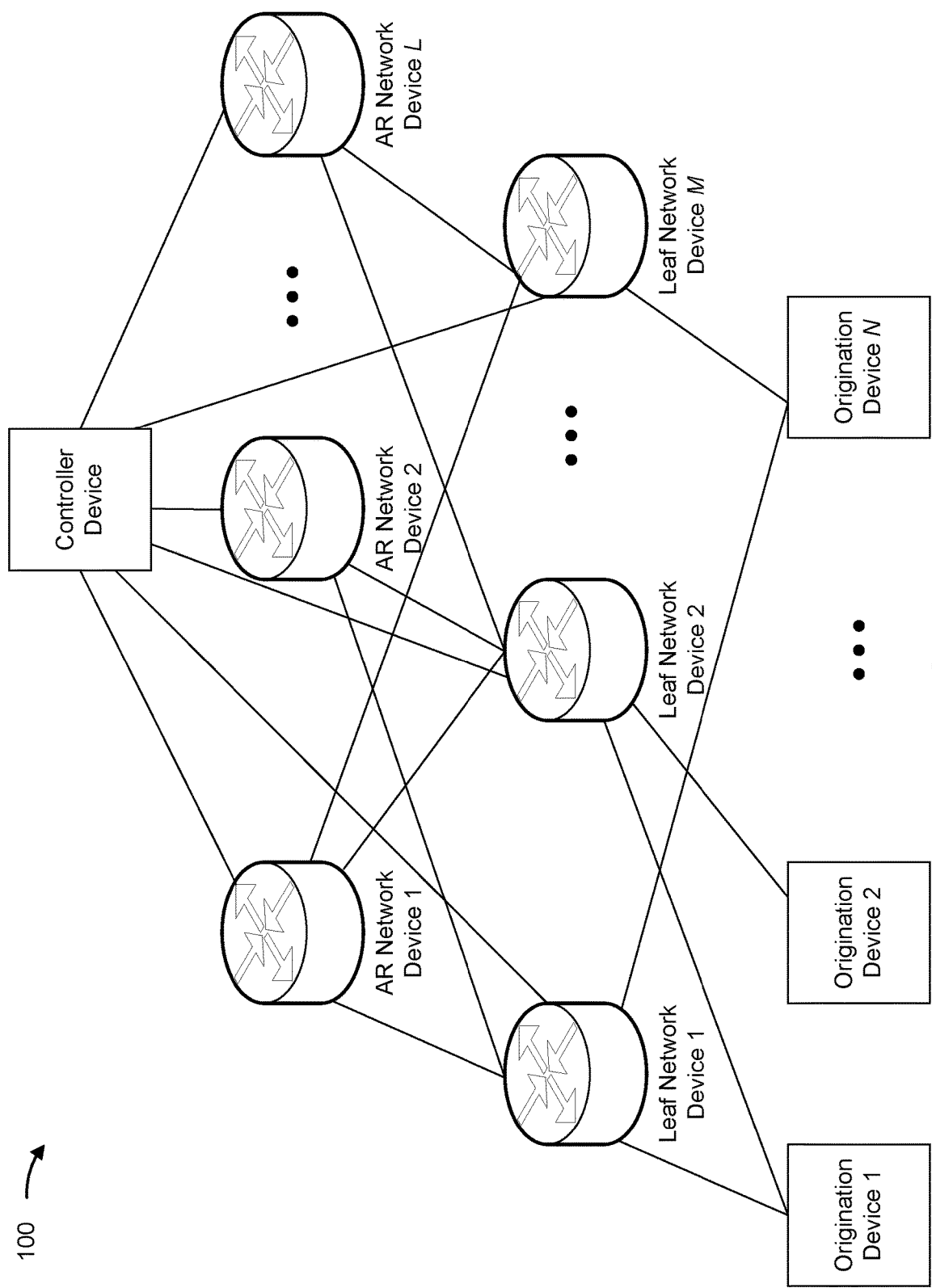
FIGS. 1A-1D are diagrams of one or more example implementations described herein.

The following detailed description of example implementations refers to the accompanying drawings. The same reference numbers in different drawings may identify the same or similar elements.

Assisted replication network devices are network devices that can be used in a network, such as an EVPN, to facilitate multicasting of traffic flows from leaf network devices of the network. For example, a leaf network device can send a traffic flow (e.g., that is to be multicast) to an assisted replication network device, which replicates the traffic flow and sends copies of the traffic flow to other network devices in the network. In many cases, an assisted replication network device has more computing resources (e.g., processing resources, memory resources, communication resources, and/or power resources, among other examples), networking resources, and/or resources than a leaf network device. In this way, a leaf network device can offload multicasting to the assisted replication network device, which reduces an amount of resources that the leaf network device needs to use to process a traffic flow and therefore reduces a likelihood that the leaf network device becomes overloaded.

Further, in many cases, a leaf network device is multi-homed with multiple assisted replication network devices and attempts to balance traffic flows across the multiple assisted replication network devices (e.g., using a non-deterministic technique, such as a hashing load balancing technique). However, some traffic flows utilize more computing resources of an assisted replication network devices than others, such as traffic flows that require high levels of replication (e.g., hundreds, thousands, and/or more replications of traffic flows). Consequently, an assisted replication network device can become overloaded (e.g., when performing high levels of replications), even when a number of traffic flows is distributed across multiple assisted replication network devices. This impacts a performance (e.g., a routing and/or multicasting performance) of the assisted replication network device, as well as a performance of the network.

Some implementations described herein provide a device (e.g., a controller device) that obtains utilization information from a plurality of assisted replication network devices of a network (e.g., an EVPN). The device then determines respective utilization values (e.g., utilization percentages) associated with the plurality of assisted replication network devices. The device thereby determines an assisted replication network device, of the plurality of assisted replication network devices, to which a leaf network device should send a traffic flow (that needs to be multicast) to ensure load balancing of the assisted replication network devices that is based on respective utilizations of the plurality of assisted replication network devices. The device sends load balancing information (e.g., that indicates the assisted replication network device) to the leaf network device to allow the leaf network device to select the assisted replication network device and to send a traffic flow to the assisted replication network device. The assisted replication network device then multicasts the traffic flow.

In this way, some implementations described herein reduce a likelihood that an assisted replication network device becomes overloaded, which reduces a likelihood that new or existing traffic flows associated with the assisted replication network device are dropped, experience increased latency, or otherwise detrimentally impacted. This improves a performance (e.g., a routing and/or multicasting performance) of the assisted replication network device and the network. Further, some implementations conserve computing resources (e.g., of the assisted replication network device, another assisted replication network device, and/or the leaf network device) that would otherwise been consumed to address issues resulting from an overloaded assisted replication network device, such as by dropping a traffic flow, reestablishing a traffic flow, and/or rerouting a traffic flow.

FIGS. 1A-1D are diagrams of one or more example implementations 100 described herein. As shown in FIGS. 1A-1D, example implementation(s) 100 may include a controller device; a plurality of network devices, which may include a plurality of assisted replication network devices (shown as AR network devices 1 through L, where L≥2) and/or a plurality of leaf network devices (shown as leaf network devices 1 through M, where M≥2); and/or a plurality of origination devices (shown as origination devices 1 through N, where N≥2). The controller device, the plurality of network devices, and the plurality of origination devices are described in more detail below in connection with FIGS. 2-4.

In some implementations, the controller device and the plurality of network devices may be included in a network, such as EVPN (sometimes referred to as an EVPN data center (DC), or an EVPN DC fabric). For example, the controller device, the plurality of assisted replication network devices, and the plurality of leaf network devices shown in FIGS. 1A-1D may be included in an EVPN. In some implementations, the controller device may be connected (e.g., via a communication link) to each network device of the plurality of network devices. For example, as shown in FIG. 1A, the controller device may be connected to the plurality of assisted replication network devices and the plurality of leaf network devices. A leaf network device, of the plurality of network devices may be multihomed by two or more assisted replication network devices of the plurality of assisted replication network devices in the network. For example, as further shown in FIG. 1A, the leaf network device 1 may be multihomed by the AR network device 1 and the AR network device 2; the leaf network device 2 may multihomed by the AR network device 1, the AR network device 2, and the AR network device L; and so on. Each origination device, of the plurality of origination device, may be connected to at least one leaf network device of the plurality of leaf network devices. For example, as further shown in FIG. 1A, the origination device 1 may be connected to the leaf network device 1 and the leaf network device 2; the origination network device 2 may be connected to the leaf network device 2; and so on. As further described herein, an origination device may provide a traffic flow to a leaf network device, of the plurality of network devices, which may provide the traffic flow to an assisted replication network device, of the plurality of assisted replication network devices, to permit the assisted replication network device to multicast the traffic flow (e.g., to other network devices).

Figure 1B:
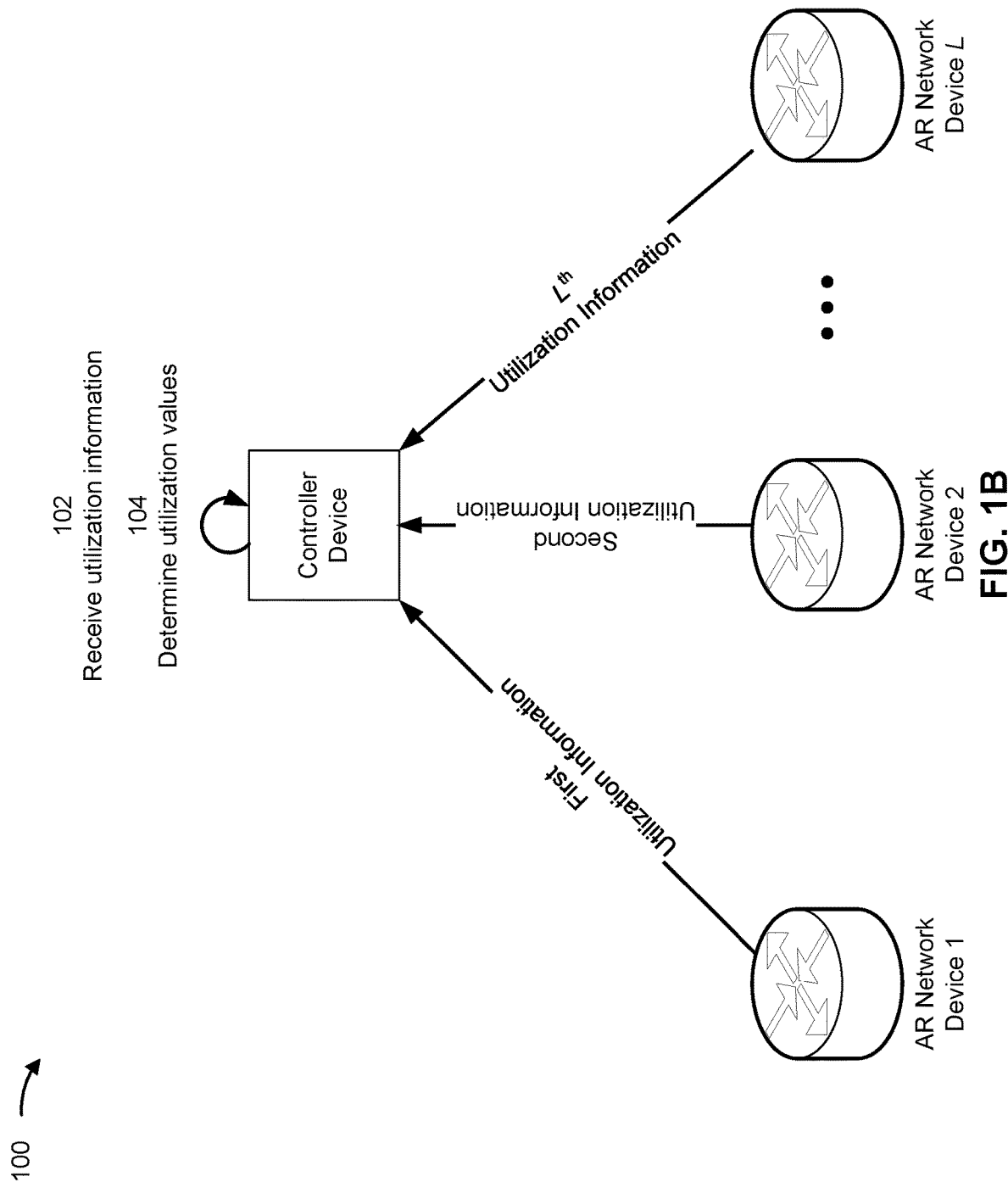

As shown in FIG. 1B, and by reference number 102, the controller device may receive respective utilization information associated with the plurality of assisted replication network devices. For example, as further shown in FIG. 1B, the controller device may receive, from a first assisted replication network device (e.g., the AR network device 1), first utilization information associated with the first assisted replication network device; may receive, from a second assisted replication network device (e.g., the AR network device 2), second utilization information associated with the second assisted replication network device, and so on.

Utilization information associated with an assisted replication network device may include an incoming traffic flow rate of the assisted replication network device (e.g., a number of incoming traffic flows to the assisted replication network device during a time window, which may be less than or equal to a second, 10 seconds, 30 second, 1 minute, 5 minutes, 10 minutes, 30 minutes, and/or an hour, among other examples), an outgoing traffic flow rate of the assisted replication network device (e.g., a number of outgoing traffic flows from the assisted replication network device during the time window), a traffic flow replication rate of the assisted replication network device (e.g., a number of traffic flow replications the assisted replication network device performs during the time window), and/or other information related to utilization of computing resources (e.g., processing resources, memory resources, communication resources, and/or power resources, among other examples) and/or other resources of the assisted replication network device. For example, with respect to FIG. 1B, the first utilization information may include an incoming traffic flow rate of the first assisted replication network device (e.g., the AR network device 1), an outgoing traffic flow rate of the first assisted replication network device, and/or a traffic flow replication rate of the first assisted replication network device; the second utilization information may include an incoming traffic flow rate of the second assisted replication network device (e.g., the AR network device 2), an outgoing traffic flow rate of the second assisted replication network device, and/or a traffic flow replication rate of the second assisted replication network device; and so on.

In some implementations, the controller device may process (e.g., parse and/or read) utilization information associated with an assisted replication network device (e.g., that the controller device received from the assisted replication network device) to determine an incoming traffic flow rate of the assisted replication network device, an outgoing traffic flow rate of the assisted replication network device, a traffic flow replication rate of the assisted replication network device, and/or other information related to utilization of computing resources and/or other resources of the assisted replication network device. For example, with respect to FIG. 1B, the controller device may process the first utilization information associated with the first assisted replication network device (e.g., the AR network device 1) to determine an incoming traffic flow rate of the first assisted replication network device, an outgoing traffic flow rate of the first assisted replication network device, a traffic flow replication rate of the first assisted replication network device, and/or other information related to utilization of computing resources and/or other resources of the first assisted replication network device; may process the second utilization information associated with the second assisted replication network device (e.g., the AR network device 2) to determine an incoming traffic flow rate of the second assisted replication network device, an outgoing traffic flow rate of the second assisted replication network device, a traffic flow replication rate of the second assisted replication network device, and/or other information related to utilization of computing resources and/or other resources of the second assisted replication network device; and so on.

As shown by reference number 104, the controller device may determine respective utilization values associated with the plurality of assisted replication network devices (e.g., based on the respective utilization information associated with the plurality of assisted replication network devices). For example, as further shown in FIG. 1B, the controller device may determine (e.g., based on the first utilization information) a first utilization value associated with the first assisted replication network device (e.g., the AR network device 1), may determine (e.g., based on the second utilization information) a second utilization value associated with the second assisted replication network device (e.g., the AR network device 2), and so on. A utilization value associated with an assisted replication network device may indicate how much one or more resources of the assisted replication network device are utilized. The utilization value may be a percentage (e.g., greater than or equal to 0% and less than or equal to 100%), a number (e.g., greater than or equal to 0 and less than or equal to 5), or another value (e.g., that includes one or more alphanumeric characters), each of which indicate a utilization amount of the one or more resources.

In some implementations, to determine a utilization value associated with an assisted replication network devices, the controller device may identify one or more capability parameters associated with the assisted replication network device. For example, the controller device may determine an incoming traffic flow rate capability parameter (e.g., a maximum number of incoming traffic flows that the assisted replication network device is capable of supporting during a time period), an outgoing traffic flow rate capability parameter (e.g., a maximum number of outgoing traffic flows that the assisted replication network device is capable of supporting during the time period), a traffic flow replication rate capability parameter (e.g., a maximum number of replications of incoming traffic flows that the assisted replication network device is capable of supporting during the time period), and/or one or more other capability parameters of the assisted replication network device. Accordingly, the controller device may determine the utilization value based on the one or more capability parameters associated with the assisted replication network device and/or corresponding information included in utilization information associated with the assisted replication network device (e.g., that the controller device received from the assisted replication network device).

For example, the controller device may determine the utilization value based on the incoming traffic flow rate capability parameter associated with the assisted replication network device, the outgoing traffic flow rate capability parameter associated with the assisted replication network device, an incoming traffic flow rate associated with the assisted replication network device (e.g., that the controller device determined based on the utilization information associated with the assisted replication network device), and/or an outgoing traffic flow rate associated with the assisted replication network device (e.g., that the controller device determined based on the utilization information associated with the assisted replication network device). The utilization value may be, for example, a combination of the incoming traffic flow rate, the incoming traffic flow rate capability parameter, the outgoing traffic flow rate, and/or the outgoing traffic flow rate capability parameter, such as a maximum value of the incoming traffic flow rate divided by the incoming traffic flow rate capability parameter and of the outgoing traffic flow rate divided by the outgoing traffic flow rate capability parameter.

As another example, the controller device may determine the utilization value based on the traffic flow replication rate capability parameter associated with the assisted replication network device and/or a traffic flow replication rate associated with the assisted replication network device (e.g., that the controller device determined based on the utilization information associated with the assisted replication network device). The utilization value may be, for example, a combination of the traffic flow replication rate capability parameter and/or the traffic flow replication rate, such as the traffic flow replication rate divided by the traffic flow replication rate capability parameter.

Figure 1C:
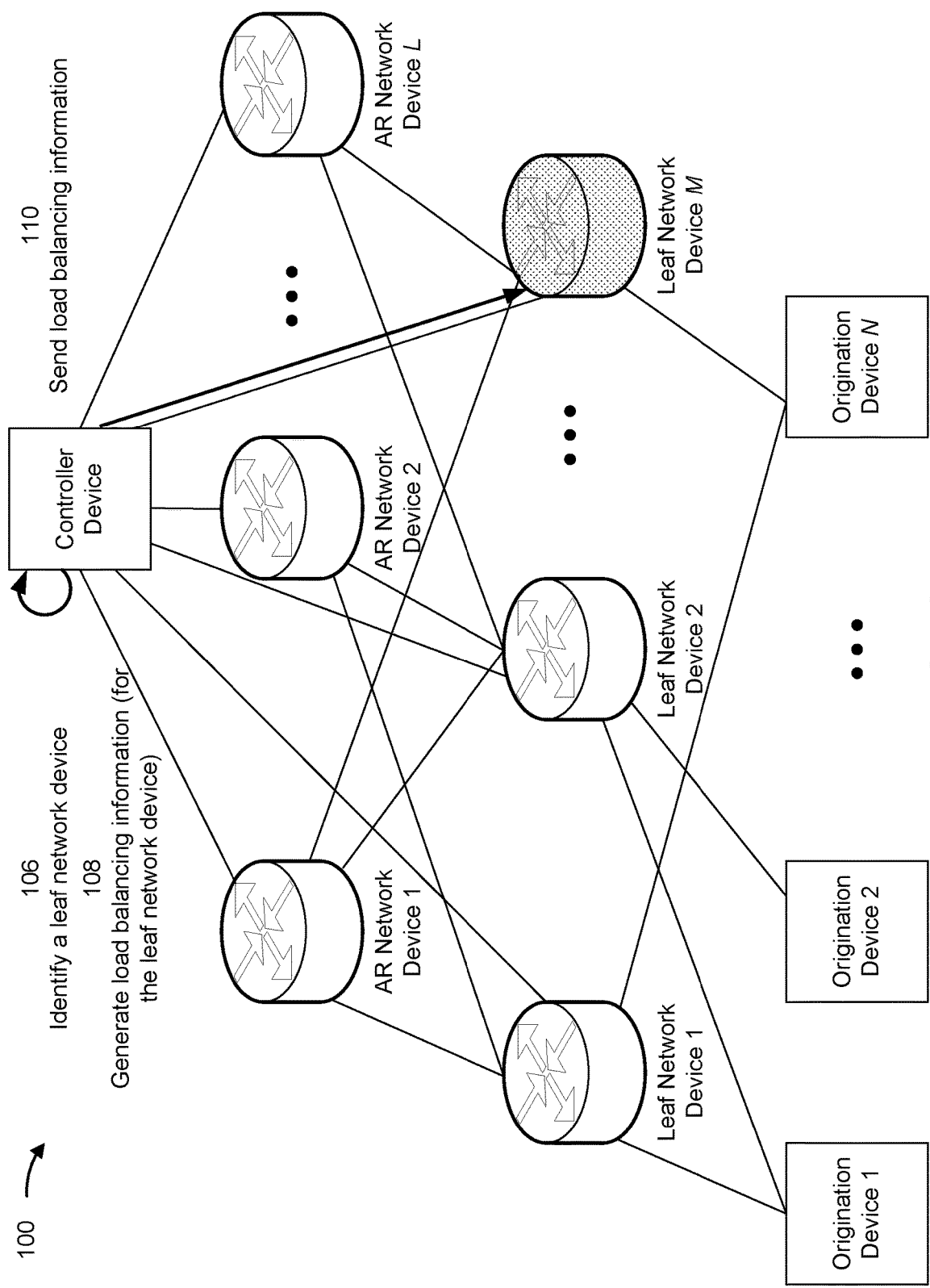

As shown in FIG. 1C, and by reference number 106, the controller device may identify a leaf network device, of the plurality of network devices. For example, the controller device may identify the leaf network device M. The leaf network device may be associated with two or more assisted replication network devices (e.g., may be multihomed with two or more assisted replication network devices). For example, as shown in FIG. 1C, the leaf network device M may be connected to a first assisted replication network device (e.g., the AR network device 1) and to a second assisted replication network device (e.g., the AR network device L).

As shown by reference number 108, the controller device may generate load balancing information for the leaf network device. The controller device may generate the load balancing based on the respective utilization values of the two or more assisted replication network devices associated with the leaf network device. For example, the controller device may generate load balancing information for the leaf network device M based on a first utilization value associated with the first assisted replication network device (e.g., the AR network device 1) and a second utilization value associated with the second assisted replication network device (e.g., the AR network device L). The load balancing information may indicate the respective utilization values associated with the two or more assisted replication network devices. For example, when the load balancing information is for the leaf network device M, the load balancing information may indicate the first utilization value and/or the second utilization value.

Additionally, or alternatively, the load balancing information may indicate a particular assisted replication network device, of the two or more assisted replication network devices, to which the leaf network device is to send a traffic flow that is to be multicast by the particular assisted replication network device. For example, when the load balancing information is for the leaf network device M, the load balancing information may indicate a particular assisted replication network device, of the first assisted replication network device (e.g., the AR network device 1) and the second assisted replication network device (e.g., the AR network device L), to which the leaf network device M is to send a traffic flow that is to be multicast (e.g., by the particular assisted replication network device).

Accordingly, to generate the load balancing information, the controller device may determine that a particular utilization value, of the respective utilization values associated with the two or more assisted replication network devices, is less than or equal to each other utilization value of the respective utilization values associated with the two or more assisted replication network devices (e.g., each utilization value that is not the particular utilization value). The controller device may therefore generate the load balancing information, wherein the load balancing information indicates an assisted replication network device, of the two or more assisted replication network devices, that is associated with the particular utilization value. For example, when the load balancing information is for the leaf network device M, to generate the load balancing information, the controller device may determine that the first utilization value associated with the first assisted replication network device (e.g., the AR network device 1) is less than or equal to the second utilization value associated with the second assisted replication network device (e.g., the AR network device L). The controller device may therefore generate the load balancing information, wherein the load balancing information indicates that the leaf network device M is to send, to the first assisted replication network device (e.g., the AR network device 1), a traffic flow that is to be multicast.

As shown by reference number 110, the controller device may send the load balancing information to the leaf network device. For example, as shown in FIG. 1C, the controller device may send, to the leaf network device M, the load balancing information that was generated by the controller device for the leaf network device M.

Figure 1D:
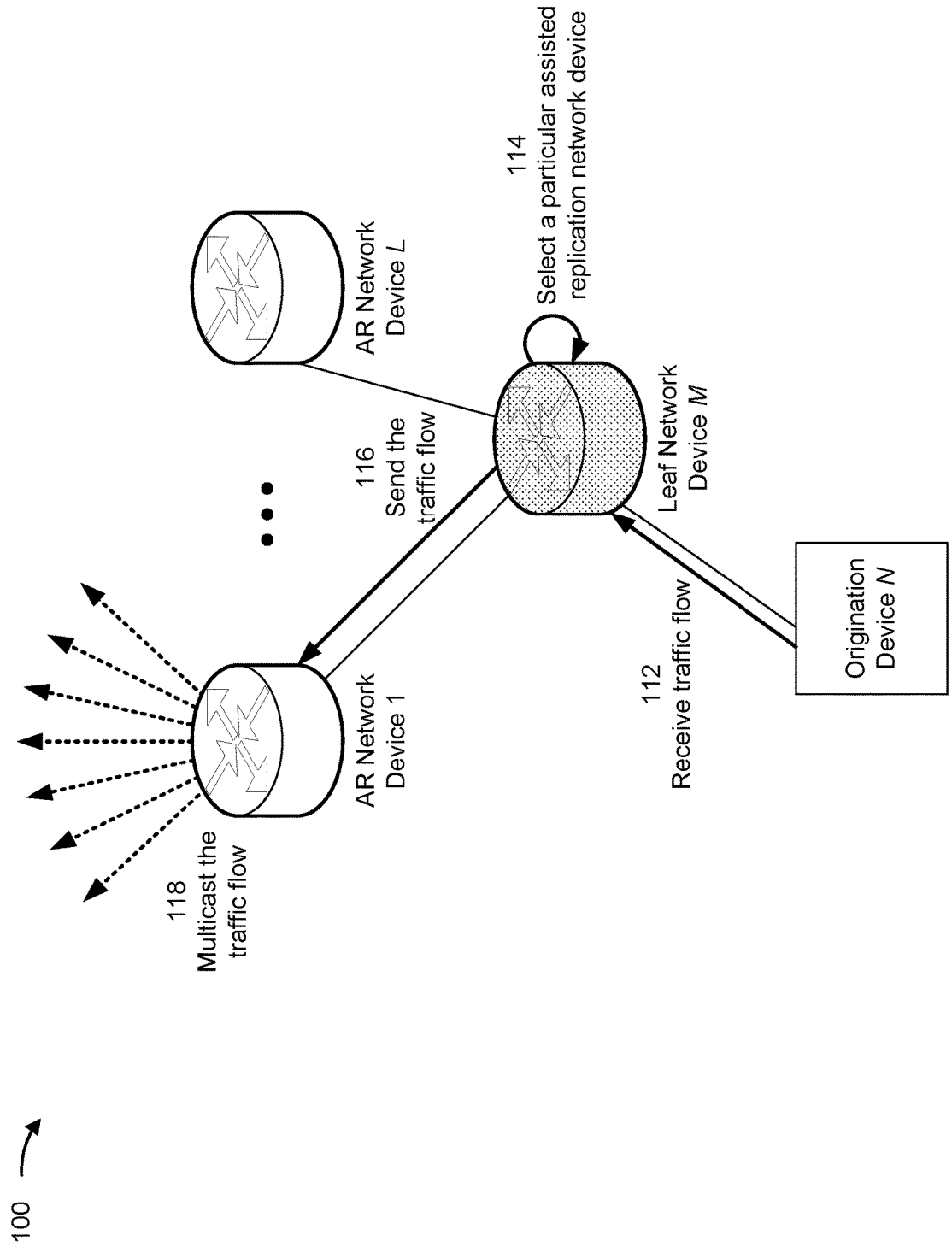

In some implementations, sending the load balancing information to the leaf network device may permit the leaf network device to select a particular assisted replication network device, of the two or more assisted replication network devices associated with the leaf network device, to which the leaf network device is to send a traffic flow that is to be multicast (e.g., by the particular assisted replication network device). For example, as shown in FIG. 1D, and further described herein, sending the load balancing information to the leaf network device M may permit the leaf network device M to select a particular assisted replication network device, of the first assisted replication network device (e.g., the AR network device 1) and the second assisted replication network device (e.g., the AR network device L), to which the network device is to send a traffic flow that is to be multicast by the particular assisted replication network device.

As shown by reference number 112, the leaf network device may receive a traffic flow, such as from an origination device. For example, as shown in FIG. 1D, the leaf network device M may receive a traffic flow from the origination device N. In some implementations, the leaf network device may receive the traffic flow after receiving the load balancing information from the controller device. That is, the traffic flow may be considered to be a "new" traffic flow to the leaf network device.

As shown by reference number 114, the leaf network device may select a particular assisted replication network device (e.g., that is to multicast the traffic flow, as described herein) of the two or more assisted replication network devices associated with the leaf network device. For example, the leaf network device M may select a particular assisted replication network device of the first assisted replication network device (e.g., the AR network device 1) and the second assisted replication network device (e.g., the AR network device L). In some implementations, the leaf network device may select the particular assisted replication network device based on the load balancing information.

For example, when the load balancing information indicates respective utilization values associated with the two or more assisted replication network devices, the leaf network device may process (e.g., parse and/or read) the load balancing information to determine the respective utilization values. The leaf network device may determine that a particular utilization value, of the respective utilization values associated with the two or more assisted replication network devices, is less than or equal to each other utilization value of the respective utilization values associated with the two or more assisted replication network devices (e.g., each utilization value that is not the particular utilization value), and may thereby select an assisted replication network device, of the two or more assisted replication network devices, that is associated with the particular utilization value. As a specific example, in relation to FIG. 1D, when the load balancing information includes the first utilization value associated with the first assisted replication network device (e.g., the AR network device 1) and the second utilization value associated with the second assisted replication network device (e.g., the AR network device L), the leaf network device M may process the load balancing information to determine the first utilization value and the second utilization value. The leaf network device M may determine that the first utilization value is less than or equal to the second utilization value, and may thereby select the first assisted replication network device (e.g., the AR network device 1).

As another example, when the load balancing information indicates that a particular assisted replication network device is to multicast a traffic flow, the leaf network device may process (e.g., parse and/or read) the load balancing information to determine that the particular assisted replication network device is to multicast the traffic flow, and may thereby select the particular assisted replication network devices. As a specific example, in relation to FIG. 1D, when the load balancing information indicates that the first assisted replication network device (e.g., AR network device 1) is to multicast a traffic flow, the leaf network device M may process the load balancing information to determine that the first assisted replication network device is to multicast the traffic flow, and may thereby select the first assisted replication network device.

As shown by reference number 116, the leaf network device may send the traffic flow to the particular assisted replication network device (e.g., that was selected by the by leaf network device based on the load balancing information). For example, as shown in FIG. 1D, the leaf network device M may send the traffic flow to the first assisted replication network device (e.g., the AR network device 1).

As shown by reference number 118, the particular assisted replication network device may multicast the traffic flow. That is, the particular assisted replication network device may replicate the traffic flow and send the traffic flow to other network devices of the plurality of network devices (e.g., based on multicast information included in the traffic flow). For example, as shown in FIG. 1D, the first assisted replication network device (e.g., the AR network device 1) may multicast the traffic flow (e.g., that the first assisted replication network device received from the leaf network device M).

As indicated above, FIGS. 1A-1D are provided merely as one or more examples. Other examples may differ from what is described with regard to FIGS. 1A-1D. The number and arrangement of devices shown in FIGS. 1A-1D are provided as one or more examples. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of FIGS. 1A-1D may perform one or more functions described as being performed by another set of devices of FIGS. 1A-1D.

Figure 2:
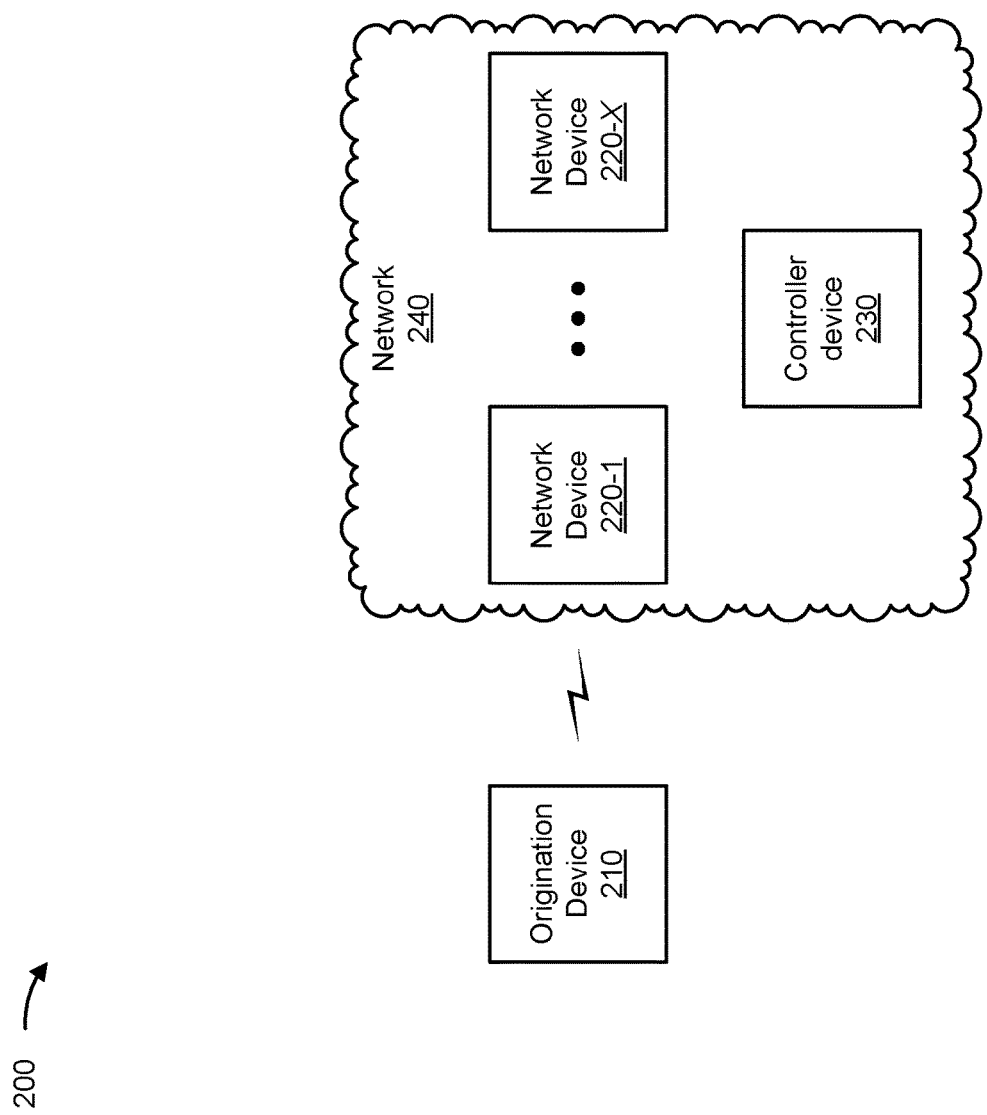
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an origination device 210, a plurality of network devices 220 (shown as network device 220-1 through network device 220-X where X≥2), a controller device 230, and a network 240. Devices of the environment 200 may interconnect via wired connections, wireless connections, or a combination of wired and wireless connections.

The origination device 210 includes one or more devices capable of receiving, generating, storing, processing, and/or providing information, such as information described herein. For example, the origination device 210 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, a server device, a group of server devices, or a similar type of device, associated with multicast traffic. In some implementations, the origination device 210 may provide a traffic flow a network device 220, as described herein.

The network device 220 includes one or more devices capable of receiving, processing, storing, routing, and/or providing traffic (e.g., a packet or other information or metadata) and/or a traffic flow in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240. In some implementations, the network device 220 may be a leaf network device (e.g., a border leaf network device or a service leaf network device), an assisted replication network device, or another type of network device.

The controller device 230 includes one or more devices capable of receiving, generating, storing, processing, and/or providing information, such as information described herein. For example, the controller device 230 may include a laptop computer, a tablet computer, a desktop computer, a server device, a group of server devices, or a similar type of device, associated with load balancing of assisted replication network devices. In some implementations, the controller device 230 may receive information from and/or transmit information to the network device 220 via the network 240.

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, or a code division multiple access (CDMA) network), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks. In some implementations, the network 240 may be an EVPN.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
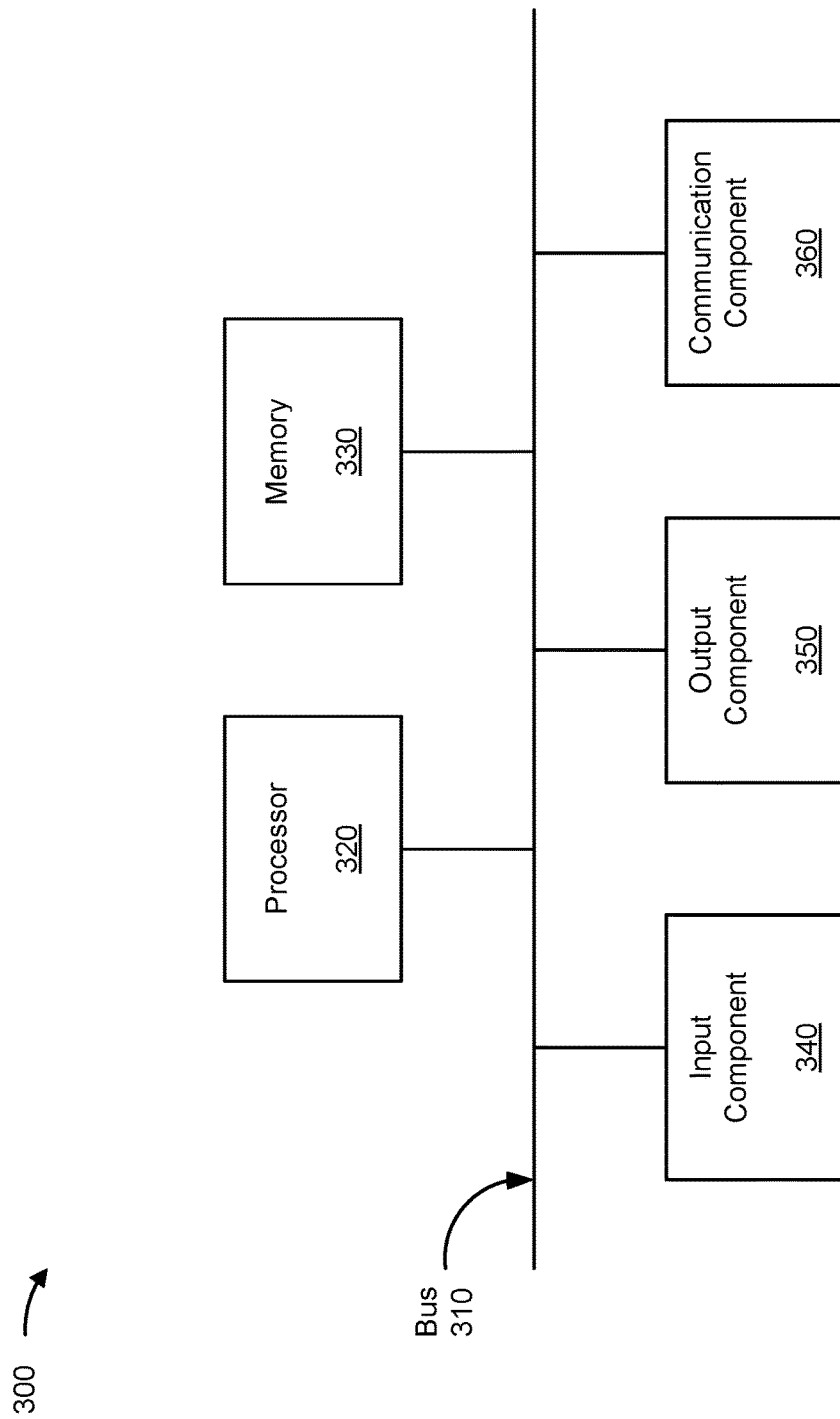
FIGS. 3 and 4 are diagrams of example components of one or more devices of FIG. 2.

FIG. 3 is a diagram of example components of a device 300 associated with load balancing of assisted replication network devices. Device 300 may correspond to the origination device 210, the network device 220, and/or the controller device 230. In some implementations, the origination device 210, the network device 220, and/or the controller device 230 may include one or more devices 300 and/or one or more components of device 300. As shown in FIG. 3, device 300 may include a bus 310, a processor 320, a memory 330, an input component 340, an output component 350, and a communication component 360.

Bus 310 may include one or more components that enable wired and/or wireless communication among the components of device 300. Bus 310 may couple together two or more components of FIG. 3, such as via operative coupling, communicative coupling, electronic coupling, and/or electric coupling. Processor 320 may include a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 may include one or more processors capable of being programmed to perform one or more operations or processes described elsewhere herein.

Memory 330 may include volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 may include one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
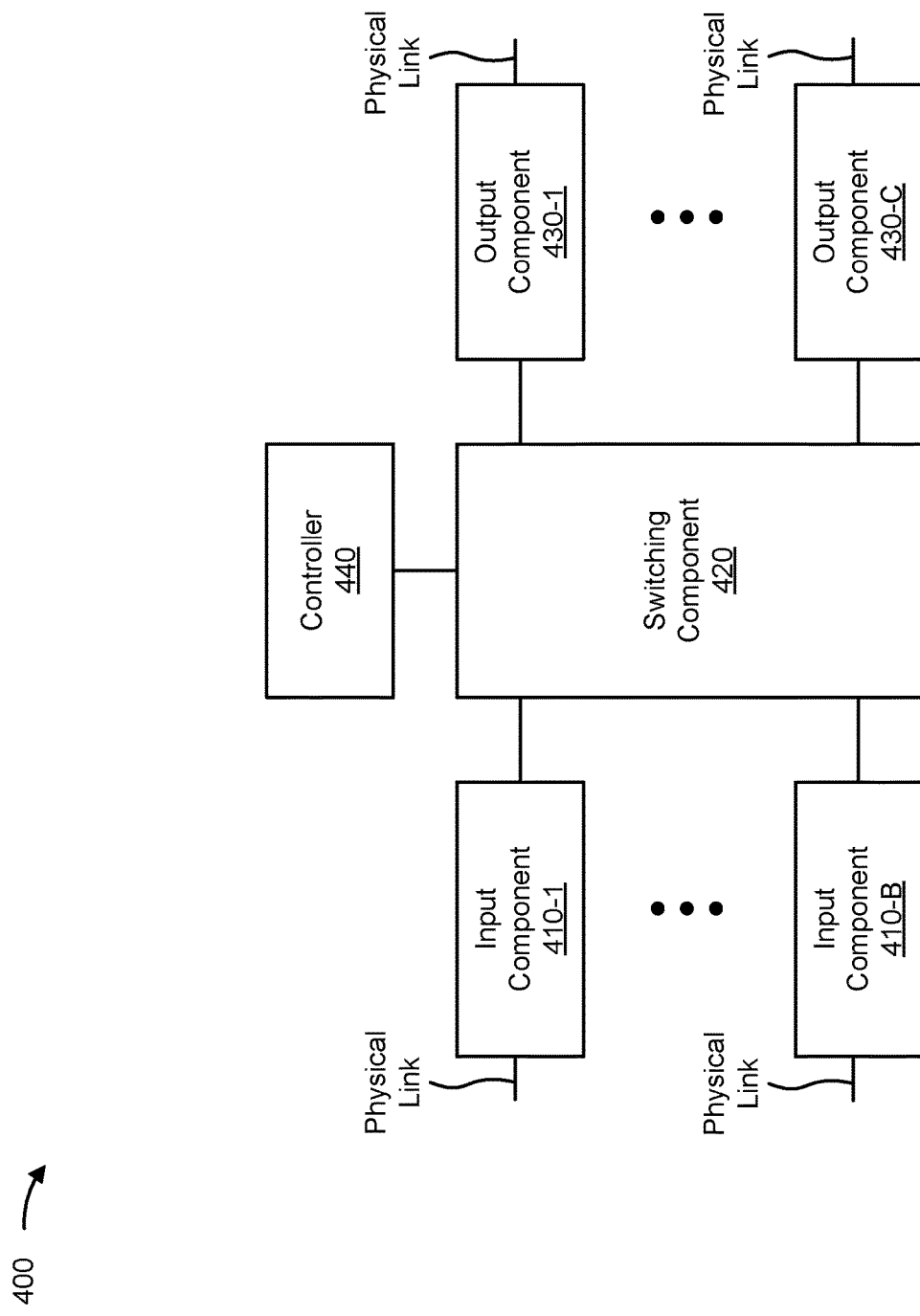

FIG. 4 is a diagram of example components of a device 400 associated with load balancing of assisted replication network devices. Device 400 may correspond to the origination device 210, the network device 220, and/or the controller device 230. In some implementations, the origination device 210, the network device 220, and/or the controller device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
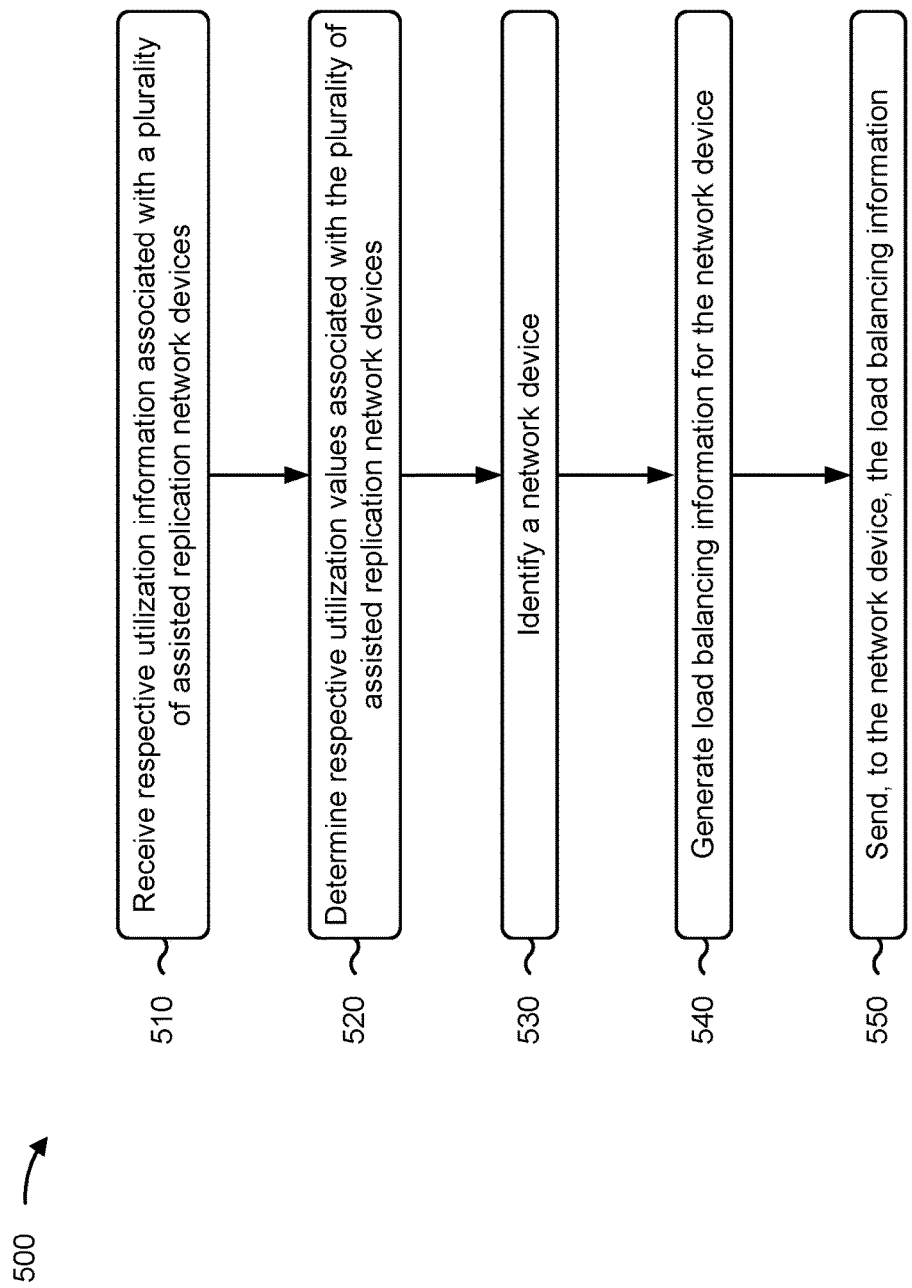
FIGS. 5 and 6 are flowcharts of example processes related to load balancing of assisted replication network devices.

FIG. 5 is a flowchart of an example process 500 associated with load balancing of assisted replication network devices. In some implementations, one or more process blocks of FIG. 5 are performed by a device (e.g., the controller device 230). In some implementations, one or more process blocks of FIG. 5 are performed by another device or a group of devices separate from or including the device, such as an origination device (e.g., the origination device 210) and/or a network device (e.g., the network device 220). Additionally, or alternatively, one or more process blocks of FIG. 5 may be performed by one or more components of the device 300, such as the processor 320, the memory 330, the input component 340, the output component 350, and/or the communication component 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include receiving respective utilization information associated with a plurality of assisted replication network devices (block 510). For example, the device may receive, from a plurality of assisted replication network devices, respective utilization information associated with the plurality of assisted replication network devices, as described above. In some implementations, the device may receive, from a first assisted replication network device, first utilization information associated with the first assisted replication network device, and may receive, from a second assisted replication network device, second utilization information associated with the second assisted replication network device, as described above.

As further shown in FIG. 5, process 500 may include determining respective utilization values associated with the plurality of assisted replication network devices (block 520). For example, the device may determine, based on the respective utilization information associated with the plurality of assisted replication network devices, respective utilization values associated with the plurality of assisted replication network devices, as described above. In some implementations, the device may determine, based on the first utilization information, a first utilization value associated with the first assisted replication network device, and may determine, based on the second utilization information, a second utilization value associated with the second assisted replication network device.

As further shown in FIG. 5, process 500 may include identifying a network device (block 530). For example, the device may identify a network device associated with two or more assisted replication network devices of the plurality of assisted replication network devices, as described above. In some implementations, the device may identify a network device associated with the first assisted replication network device and the second assisted replication network device.

As further shown in FIG. 5, process 500 may include generating load balancing information for the network device (block 540). For example, the device may generate, based on the respective utilization information associated with the plurality of assisted replication network devices, load balancing information for the network device, as described above. In some implementations, the device may generate, based on identifying the network device, the first utilization value, and the second utilization value, load balancing information for the network device.

As further shown in FIG. 5, process 500 may include sending, to the network device, the load balancing information (block 550). For example, the device may send, to the network device, the load balancing information, as described above. In some implementations, sending the load balancing information to the network device is to permit the network device to select a particular assisted replication network device, of the two or more assisted replication network devices (or of the first assisted replication network device and the second assisted replication network device), to which the network device is to send a traffic flow that is to be multicast by the particular assisted replication network device.

Process 500 may include additional implementations, such as any single implementation or any combination of implementations described below and/or in connection with one or more other processes described elsewhere herein.

In a first implementation, the device, the first assisted replication network device, and the second assisted replication network device are included in an EVPN, and wherein the network device is a leaf network device in the EVPN and multihomed by the first assisted replication network device and the second assisted replication network device.

In a second implementation, alone or in combination with the first implementation, the first utilization information includes at least one of an incoming traffic flow rate of the first assisted replication network device, an outgoing traffic flow rate of the first assisted replication network device, or a traffic flow replication rate of the first assisted replication network device.

In a third implementation, alone or in combination with one or more of the first and second implementations, determining the first utilization value includes identifying an incoming traffic flow rate capability parameter associated with the first assisted replication network device and an outgoing traffic flow rate capability parameter associated with the first assisted replication network device; determining, based on the first utilization information, an incoming traffic flow rate of the first assisted replication network device and an outgoing traffic flow rate of the first assisted replication network device; and determining, based on the incoming traffic flow rate capability parameter, the outgoing traffic flow rate capability parameter, the incoming traffic flow rate, and the outgoing traffic flow rate, the first utilization value.

In a fourth implementation, alone or in combination with one or more of the first through third implementations, determining the first utilization value includes identifying a traffic flow replication rate capability parameter associated with the first assisted replication network device; determining, based on the first utilization information, a traffic flow replication rate of the first assisted replication network device; and determining, based on the traffic flow replication rate capability parameter and the traffic flow replication rate, the first utilization value.

In a fifth implementation, alone or in combination with one or more of the first through fourth implementations, generating the load balancing information includes determining that the first utilization value is less than or equal to the second utilization value; and generating, based on determining that the first utilization value is less than or equal to the second utilization value, the load balancing information, wherein the load balancing information indicates that the network device is to send, to the first assisted replication network device, the traffic flow that is to be multicast.

In a sixth implementation, alone or in combination with one or more of the first through fifth implementations, the load balancing information indicates at least one of the first utilization value, the second utilization value, or the particular assisted replication network device, of the first assisted replication network device and the second assisted replication network device, to which the network device is to send the traffic flow that is to be multicast by the particular assisted replication network device.

In a seventh implementation, alone or in combination with one or more of the first through sixth implementations, the plurality of assisted replication network devices are included in an EVPN, and wherein the network device is included in the EVPN and multihomed by the two or more assisted replication network devices.

In an eighth implementation, alone or in combination with one or more of the first through seventh implementations, the particular utilization information includes at least one of an incoming traffic flow rate of the particular assisted replication network device, an outgoing traffic flow rate of the particular assisted replication network device, or a traffic flow replication rate of the particular assisted replication network device.

In a ninth implementation, alone or in combination with one or more of the first through eighth implementations, generating the load balancing information includes determining, based on the respective utilization information associated with the plurality of assisted replication network devices, respective utilization values associated with the plurality of assisted replication network devices; and generating, based on the respective utilization values associated with the plurality of assisted replication network devices, the load balancing information.

In a tenth implementation, alone or in combination with one or more of the first through ninth implementations, determining the respective utilization values associated with the plurality of assisted replication network devices includes determining, based on particular utilization information associated with a particular assisted replication network device, of the respective utilization information associated with the plurality of assisted replication network devices, an incoming traffic flow rate of the particular assisted replication network device and an outgoing traffic flow rate of the particular assisted replication network device; and determining, based on the incoming traffic flow rate of the particular assisted replication network device and the outgoing traffic flow rate of the particular assisted replication network device, a particular utilization value associated with the particular assisted replication network device.

In an eleventh implementation, alone or in combination with one or more of the first through tenth implementations, determining the respective utilization values associated with the plurality of assisted replication network devices includes determining, based on particular utilization information associated with a particular assisted replication network device, of the respective utilization information associated with the plurality of assisted replication network devices, a traffic flow replication rate of the particular assisted replication network device; and determining, based on the traffic flow replication rate, a particular utilization value associated with the particular assisted replication network device In an twelfth implementation, alone or in combination with one or more of the first through eleventh implementations, the load balancing information indicates at least one of respective utilization values associated with the two or more assisted replication network devices, or a particular assisted replication network device, of the two or more assisted replication network devices, to which the network device is to send a traffic flow that is to be multicast by the particular assisted replication network device.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
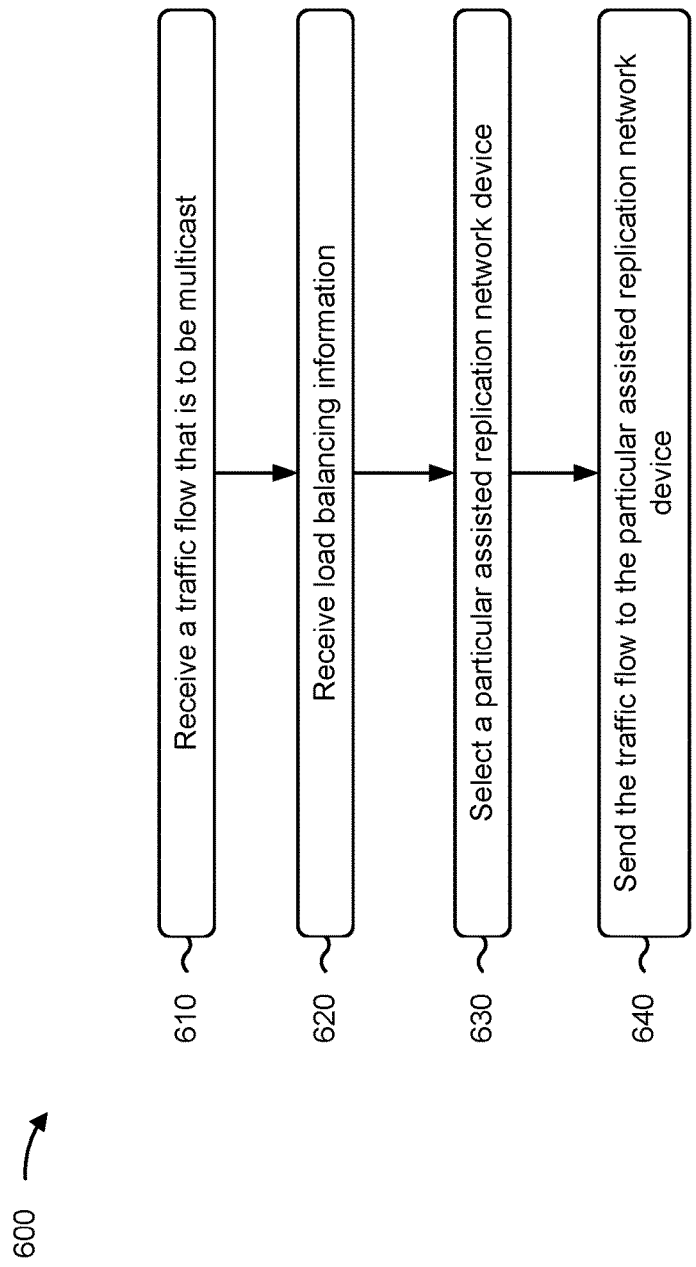

FIG. 6 is a flowchart of an example process 600 associated with load balancing of assisted replication network devices. In some implementations, one or more process blocks of FIG. 6 are performed by a network device (e.g., the network device 220). In some implementations, one or more process blocks of FIG. 6 are performed by another device or a group of devices separate from or including the network device, such as an origination device (e.g., the origination device 210) and/or a controller device (e.g., the controller device 230). Additionally, or alternatively, one or more process blocks of FIG. 6 may be performed by one or more components of the device 300, such as the processor 320, the memory 330, the input component 340, the output component 350, and/or the communication component 360. Additionally, or alternatively, one or more process blocks of FIG. 6 may be performed by one or more components of the device 400, such as the input component 410, the switching component 420, the output component 430, and/or the controller 440.

As shown in FIG. 6, process 600 may include receiving a traffic flow that is to be multicast (block 610). For example, the network device may receive, from an origination device, a traffic flow that is to be multicast, as described above.

As further shown in FIG. 6, process 600 may include receiving load balancing information (block 620). For example, the network device may receive, from another device, load balancing information, as described above.

As further shown in FIG. 6, process 600 may include selecting a particular assisted replication network device (block 630). For example, the network device may select, based on the load balancing information, a particular assisted replication network device of two or more assisted replication network devices associated with the network device, as described above.

As further shown in FIG. 6, process 600 may include sending the traffic flow to the particular assisted replication network device (block 640). For example, the network device may send the traffic flow to the particular assisted replication network device, as described above. In some implementations, sending the traffic flow to the particular assisted replication network device permits the particular assisted replication network device to multicast the traffic flow.

Process 600 may include additional implementations, such as any single implementation or any combination of implementations described below and/or in connection with one or more other processes described elsewhere herein.

In a first implementation, the network device, the other device, and the two or more assisted replication network devices are included in an EVPN, and wherein the network device is multihomed by the two or more assisted replication network devices.

In a second implementation, alone or in combination with the first implementation, the load balancing information indicates at least one of respective utilization values associated with the two or more assisted replication network devices, or that the particular assisted replication network device is to multicast the traffic flow.

In a third implementation, alone or in combination with one or more of the first and second implementations, selecting the particular assisted replication network device includes determining, based on the load balancing information, respective utilization values associated with the two or more assisted replication network devices; determining a particular utilization value, of the respective utilization values associated with the two or more assisted replication network devices, that is less than or equal to each other utilization value of the respective utilization values associated with the two or more assisted replication network devices; and selecting, as the particular assisted replication network device, an assisted replication network device, of the two or more assisted replication network devices, that is associated with the particular utilization value.

In a fourth implementation, alone or in combination with one or more of the first through third implementations, selecting the particular assisted replication network device includes determining, based on the load balancing information, that the particular assisted replication network device is to multicast the traffic flow, and selecting, based on determining that the particular assisted replication network device is to multicast the traffic flow, the particular assisted replication network device.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic, traffic flow, or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
one or more memories; and
one or more processors to:
receive, from a first assisted replication network device, first utilization information associated with the first assisted replication network device;
receive, from a second assisted replication network device, second utilization information associated with the second assisted replication network device;
determine, based on the first utilization information, a first utilization value associated with the first assisted replication network device;
determine, based on the second utilization information, a second utilization value associated with the second assisted replication network device;
identify a network device associated with the first assisted replication network device and the second assisted replication network device;
generate, based on identifying the network device, the first utilization value, and the second utilization value, load balancing information for the network device; and
send, to the network device, the load balancing information,
wherein sending the load balancing information to the network device is to permit the network device to select a particular assisted replication network device, of the first assisted replication network device and the second assisted replication network device, to which the network device is to send a traffic flow that is to be multicast by the particular assisted replication network device.

2. The device of claim 1, wherein the device, the first assisted replication network device, and the second assisted replication network device are included in an Ethernet virtual private network (EVPN), and
wherein the network device is a leaf network device in the EVPN and multihomed by the first assisted replication network device and the second assisted replication network device.

3. The device of claim 1, wherein the first utilization information includes at least one of:
an incoming traffic flow rate of the first assisted replication network device;
an outgoing traffic flow rate of the first assisted replication network device; or
a traffic flow replication rate of the first assisted replication network device.

4. The device of claim 1, wherein the one or more processors, to determine the first utilization value, are to:
identify an incoming traffic flow rate capability parameter associated with the first assisted replication network device and an outgoing traffic flow rate capability parameter associated with the first assisted replication network device;
determine, based on the first utilization information, an incoming traffic flow rate of the first assisted replication network device and an outgoing traffic flow rate of the first assisted replication network device; and
determine, based on the incoming traffic flow rate capability parameter, the outgoing traffic flow rate capability parameter, the incoming traffic flow rate, and the outgoing traffic flow rate, the first utilization value.

5. The device of claim 1, wherein the one or more processors, to determine the first utilization value, are to:
identify a traffic flow replication rate capability parameter associated with the first assisted replication network device;
determine, based on the first utilization information, a traffic flow replication rate of the first assisted replication network device; and
determine, based on the traffic flow replication rate capability parameter and the traffic flow replication rate, the first utilization value.

6. The device of claim 1, wherein the one or more processors, to generate the load balancing information, are to:
determine that the first utilization value is less than or equal to the second utilization value; and
generate, based on determining that the first utilization value is less than or equal to the second utilization value, the load balancing information,
wherein the load balancing information indicates that the network device is to send, to the first assisted replication network device, the traffic flow that is to be multicast.

7. The device of claim 1, wherein the load balancing information indicates at least one of:
the first utilization value;
the second utilization value; or
the particular assisted replication network device, of the first assisted replication network device and the second assisted replication network device, to which the network device is to send the traffic flow that is to be multicast by the particular assisted replication network device.

8. A method, comprising:
receiving, by a device and from a plurality of assisted replication network devices, respective utilization information associated with the plurality of assisted replication network devices;
generating, by the device and based on the respective utilization information associated with the plurality of assisted replication network devices, load balancing information for a network device associated with two or more assisted replication network devices of the plurality of assisted replication network devices; and
sending, by the device and to the network device, the load balancing information.

9. The method of claim 8, wherein sending the load balancing information to the network device is to permit the network device to select a particular assisted replication network device, of the two or more assisted replication network devices, to which the network device is to send a traffic flow that is to be multicast by the particular assisted replication network device.

10. The method of claim 8, wherein the plurality of assisted replication network devices are included in an Ethernet virtual private network (EVPN), and
wherein the network device is included in the EVPN and multihomed by the two or more assisted replication network devices.

11. The method of claim 8, wherein particular utilization information associated with a particular assisted replication network device, of the respective utilization information associated with the plurality of assisted replication network devices, includes at least one of:
an incoming traffic flow rate of the particular assisted replication network device;
an outgoing traffic flow rate of the particular assisted replication network device; or
a traffic flow replication rate of the particular assisted replication network device.

12. The method of claim 8, wherein generating the load balancing information comprises:
determining, based on the respective utilization information associated with the plurality of assisted replication network devices, respective utilization values associated with the plurality of assisted replication network devices; and
generating, based on the respective utilization values associated with the plurality of assisted replication network devices, the load balancing information.

13. The method of claim 12, wherein determining the respective utilization values associated with the plurality of assisted replication network devices comprises:
determining, based on particular utilization information associated with a particular assisted replication network device, of the respective utilization information associated with the plurality of assisted replication network devices, an incoming traffic flow rate of the particular assisted replication network device and an outgoing traffic flow rate of the particular assisted replication network device; and
determining, based on the incoming traffic flow rate of the particular assisted replication network device and the outgoing traffic flow rate of the particular assisted replication network device, a particular utilization value associated with the particular assisted replication network device.

14. The method of claim 12, wherein determining the respective utilization values associated with the plurality of assisted replication network devices comprises:
- determining, based on particular utilization information associated with a particular assisted replication network device, of the respective utilization information associated with the plurality of assisted replication network devices, a traffic flow replication rate of the particular assisted replication network device; and
- determining, based on the traffic flow replication rate, a particular utilization value associated with the particular assisted replication network device.

15. The method of claim 8, wherein the load balancing information indicates at least one of:
- respective utilization values associated with the two or more assisted replication network devices; or
- a particular assisted replication network device, of the two or more assisted replication network devices, to which the network device is to send a traffic flow that is to be multicast by the particular assisted replication network device.

16. A non-transitory computer-readable medium storing a set of instructions, the set of instructions comprising:
- one or more instructions that, when executed by one or more processors of a network device, cause the network device to:
  - receive, from an origination device, a traffic flow that is to be multicast;
  - receive, from another device, load balancing information;
  - select, based on the load balancing information, a particular assisted replication network device of two or more assisted replication network devices associated with the network device; and
  - send the traffic flow to the particular assisted replication network device,
    - wherein sending the traffic flow to the particular assisted replication network device permits the particular assisted replication network device to multicast the traffic flow.

17. The non-transitory computer-readable medium of claim 16, wherein the network device, the other device, and the two or more assisted replication network devices are included in an Ethernet virtual private network (EVPN), and
- wherein the network device is multihomed by the two or more assisted replication network devices.

18. The non-transitory computer-readable medium of claim 16, wherein the load balancing information indicates at least one of:
- respective utilization values associated with the two or more assisted replication network devices; or
- that the particular assisted replication network device is to multicast the traffic flow.

19. The non-transitory computer-readable medium of claim 16, wherein the one or more instructions, that cause the network device to select the particular assisted replication network device, cause the network device to:
- determine, based on the load balancing information, respective utilization values associated with the two or more assisted replication network devices;
- determine a particular utilization value, of the respective utilization values associated with the two or more assisted replication network devices, that is less than or equal to each other utilization value of the respective utilization values associated with the two or more assisted replication network devices; and
- select, as the particular assisted replication network device, an assisted replication network device, of the two or more assisted replication network devices, that is associated with the particular utilization value.

20. The non-transitory computer-readable medium of claim 16, wherein the one or more instructions, that cause the network device to select the particular assisted replication network device, cause the network device to:
- determine, based on the load balancing information, that the particular assisted replication network device is to multicast the traffic flow; and
- select, based on determining that the particular assisted replication network device is to multicast the traffic flow, the particular assisted replication network device.

* * * * *